(12) United States Patent
Takeshima et al.

(10) Patent No.: US 12,138,589 B2
(45) Date of Patent: Nov. 12, 2024

(54) EXHAUST GAS CONTROL SYSTEM AND EXHAUST GAS CONTROL METHOD

(71) Applicant: TOYOTA JIDOSHA KABUSHIKI KAISHA, Aichi-ken (JP)

(72) Inventors: Shinichi Takeshima, Numazu (JP); Hiromasa Nishioka, Susono (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 377 days.

(21) Appl. No.: 17/857,182

(22) Filed: Jul. 5, 2022

(65) Prior Publication Data

US 2023/0086873 A1 Mar. 23, 2023

(30) Foreign Application Priority Data

Sep. 10, 2021 (JP) ................. 2021-147945

(51) Int. Cl.
*B01D 53/94* (2006.01)
*F01N 3/08* (2006.01)

(52) U.S. Cl.
CPC ......... *B01D 53/945* (2013.01); *F01N 3/0814* (2013.01); *B01D 2255/1021* (2013.01); *B01D 2255/1023* (2013.01); *B01D 2255/1025* (2013.01); *B01D 2255/2063* (2013.01); *B01D 2255/2065* (2013.01); *B01D 2255/2066* (2013.01); *B01D 2255/9022* (2013.01); *B01D 2255/908* (2013.01)

(58) Field of Classification Search
CPC ........ F02B 33/36; F04D 17/10; F04D 29/284; B01D 2255/1021; B01D 2255/1023; B01D 2255/1025; B01D 2255/2063; B01D 2255/2065; B01D 2255/2066; B01D 2255/9022; B01D 2255/9032; B01D 2255/908; B01D 2258/014; B01D 53/945; B01J 23/10; B01J 35/613; B01J 37/10; F01N 13/0097; F01N 13/16; F01N 2510/068; F01N 3/0814; Y02T 10/12
See application file for complete search history.

(56) References Cited

U.S. PATENT DOCUMENTS

| | | | | |
|---|---|---|---|---|
| 10,329,984 | B2 * | 6/2019 | Hatanaka | ................. B01J 37/04 |
| 2006/0010854 | A1 * | 1/2006 | Nakano | ............... F01N 13/0093 60/285 |
| 2014/0323294 | A1 | 10/2014 | Nagao et al. | |

FOREIGN PATENT DOCUMENTS

| | | | | |
|---|---|---|---|---|
| JP | 2000327329 A | * | 11/2000 | ......... B01D 53/9422 |
| JP | 2005-95761 A | | 4/2005 | |
| JP | 2007-46494 A | | 2/2007 | |
| JP | 2014-210229 A | | 11/2014 | |

(Continued)

*Primary Examiner* — Jesse S Bogue
(74) *Attorney, Agent, or Firm* — HAUPTMAN HAM, LLP (57) ABSTRACT

An exhaust gas control system according to the present disclosure includes: a first exhaust gas control catalyst layer that controls an exhaust gas emitted from an internal combustion engine; and a second exhaust gas control catalyst layer that further controls the exhaust gas that has been controlled by the first exhaust gas control catalyst layer. The second exhaust gas control catalyst layer contains an oxygen storage material. The ratio of the amount (mmol—$CO_2/m^2$) of base points per specific surface area ($m^2/g$) of the oxygen storage material to the specific surface area is equal to or less than $4.50 \times 10^{-5}$.

12 Claims, 3 Drawing Sheets

(56) References Cited

FOREIGN PATENT DOCUMENTS

| WO | WO-2007011062 A1 | * | 1/2007 | ............ | B01D 53/944 |
| WO | WO-2019050336 A1 | * | 3/2019 | .............. | B01J 21/02 |

* cited by examiner

EXHAUST GAS CONTROL SYSTEM AND EXHAUST GAS CONTROL METHOD

CROSS-REFERENCE TO RELATED APPLICATION

This application claims priority to Japanese Patent Application No. 2021-147945 filed Sep. 10, 2021, incorporated herein by reference in its entirety.

BACKGROUND

1. Technical Field

The present disclosure relates to an exhaust gas control system and an exhaust gas control method.

2. Description of Related Art

Japanese Unexamined Patent Application Publication No. 2005-95761 (JP 2005-95761 A) discloses an exhaust gas control catalyst that includes zeolite particles that carry first precious metal and a porous oxide layer that is formed on the surface of the zeolite particles and that carries second precious metal. JP 2005-95761 A indicates that coking of the exhaust gas control catalyst is suppressed by such a configuration.

Japanese Unexamined Patent Application Publication No. 2007-46494 (JP 2007-46494 A) indicates that a recovery from hydrocarbon (HC) poisoning can be made before coking occurs, by supplying oxygen to a three-way catalyst by controlling an air-fuel ratio according to a predetermined condition.

Japanese Unexamined Patent Application Publication No. 2014-210229 (JP 2014-210229 A) discloses an exhaust gas control catalyst composition that includes ceria-zirconia particles having two separate peak tops due to the (111) plane in an X-ray diffraction (XRD) pattern, and in which specific transition metal is carried by the ceria-zirconia particles.

SUMMARY

In an exhaust gas control system that controls an exhaust gas emitted from an internal combustion engine, the likelihood of HC poisoning and coking increases toward the downstream side of an exhaust gas control catalyst layer. This is considered to occur because the concentration of oxygen in the exhaust gas is lowered, for example, toward the downstream side of the exhaust gas control catalyst layer, which brings the $O_2/C$ ratio, $H_2O/C$ ratio, and the temperature of the exhaust gas into a specific region, so that a chemical equilibrium of carbon deposition is reached.

In order to suppress HC poisoning and coking, it is conceivable to apply the techniques disclosed in JP 2005-95761 A and JP 2007-46494 A, for example, to the exhaust gas control system.

However, it is desired to suppress HC poisoning and coking without applying such techniques.

The present disclosure provides an exhaust gas control system and an exhaust gas control method that can suppress HC poisoning and coking.

The present discloser provides the above exhaust gas control system and an exhaust gas control method implemented as follows.

Aspect 1
An exhaust gas control system including: a first exhaust gas control catalyst layer that controls an exhaust gas emitted from an internal combustion engine; and
a second exhaust gas control catalyst layer that further controls the exhaust gas that has been controlled by the first exhaust gas control catalyst layer, in which
the second exhaust gas control catalyst layer contains an oxygen storage material, and a ratio of an amount (mmol—$CO_2/m^2$) of base points per specific surface area ($m^2/g$) of the oxygen storage material to the specific surface area is equal to or less than $4.50 \times 10^{-5}$.

Aspect 2
The exhaust gas control system according to aspect 1, in which the specific surface area of the oxygen storage material may be 40.0 $m^2/g$ to 110.0 $m^2/g$.

Aspect 3
The exhaust gas control system according to aspect 1 or 2, in which the oxygen storage material may be an oxide containing Ce, La, Pr, or a combination of Ce, La, or Pr.

Aspect 4
The exhaust gas control system according to any one of aspects 1 to 3, in which the oxygen storage material may be $CeO_2$, $LaO_2$, $PrO_2$, or a combination of $CeO_2$, $LaO_2$, or $PrO_2$.

Aspect 5
The exhaust gas control system according to any one of aspects 1 to 4, in which the oxygen storage material may have a fluorite structure.

Aspect 6
The exhaust gas control system according to any one of aspects 1 to 5, in which the second exhaust gas control catalyst layer further may contain catalytic metal particles.

Aspect 7
The exhaust gas control system according to aspect 6, in which the catalytic metal particles may be particles of Pt, Pd, or Rh.

Aspect 8
The exhaust gas control system according to any one of aspects 1 to 7, in which the first exhaust gas control catalyst layer may contain an oxygen storage material of which a ratio of an amount (mmol—$CO_2/m^2$) of base points per specific surface area ($m^2/g$) to the specific surface area is more than $4.50 \times 10^{-5}$.

Aspect 9
The exhaust gas control system according to any one of aspects 1 to 8, in which the second exhaust gas control catalyst layer may be positioned downstream of the first exhaust gas control catalyst layer.

Aspect 10
A method of controlling an exhaust gas emitted from an internal combustion engine, the method including:
controlling, by a first exhaust gas control catalyst layer, the exhaust gas emitted from the internal combustion engine; and
further controlling, by a second exhaust gas control catalyst layer, the exhaust gas that has been controlled by the first exhaust gas control catalyst layer, in which
the second exhaust gas control catalyst layer contains an oxygen storage material, and
a ratio of an amount (mmol—$CO_2/m^2$) of base points per specific surface area ($m^2/g$) of the oxygen storage material to the specific surface area is equal to or less than $4.50 \times 10^{-5}$.

Aspect 11
The method according to aspect 10, in which the first exhaust gas control catalyst layer may contain an oxygen storage material of which a ratio of an amount (mmol—

$CO_2/m^2$) of base points per specific surface area ($m^2/g$) to the specific surface area is more than $4.50\times10^{-5}$.

Aspect 12

The method according to aspect 10 or 11, in which the exhaust gas may flow in an exhaust gas control system in an order of the first exhaust gas control catalyst layer and the second exhaust gas control catalyst layer.

With the present disclosure, it is possible to provide an exhaust gas control system that can suppress HC poisoning and coking.

BRIEF DESCRIPTION OF THE DRAWINGS

Features, advantages, and technical and industrial significance of exemplary embodiments will be described below with reference to the accompanying drawings, in which like signs denote like elements, and wherein.

DETAILED DESCRIPTION OF EMBODIMENTS

An embodiment of the present disclosure will be discussed in detail below. The present disclosure is not limited to the following embodiment, and can be implemented with a variety of modifications without departing from the scope of the present disclosure.

Exhaust Gas Control System

An exhaust gas control system according to the present disclosure includes: a first exhaust gas control catalyst layer that controls an exhaust gas emitted from an internal combustion engine; and a second exhaust gas control catalyst layer that further controls the exhaust gas that has been controlled by the first exhaust gas control catalyst layer, in which the second exhaust gas control catalyst layer contains an oxygen storage material, and the ratio of the amount (mmol—$CO_2/m^2$) of base points per specific surface area ($m^2/g$) of the oxygen storage material to the specific surface area is equal to or less than $4.50\times10^{-5}$.

The internal combustion engine to which the present exhaust gas control system is applicable may be an internal combustion engine mounted on a riding object, more specifically on a vehicle, still more specifically on an automobile.

Without being bound by theory, the exhaust gas control system according to the present disclosure can suppress HC poisoning and coking under the following principles.

In an exhaust gas control system that controls an exhaust gas emitted from an internal combustion engine, as described above, the likelihood of HC poisoning and coking increases toward the downstream side of an exhaust gas control catalyst layer. This is considered to occur because the concentration of oxygen in the exhaust gas is lowered, for example, toward the downstream side of the exhaust gas control catalyst layer.

Figure 1:
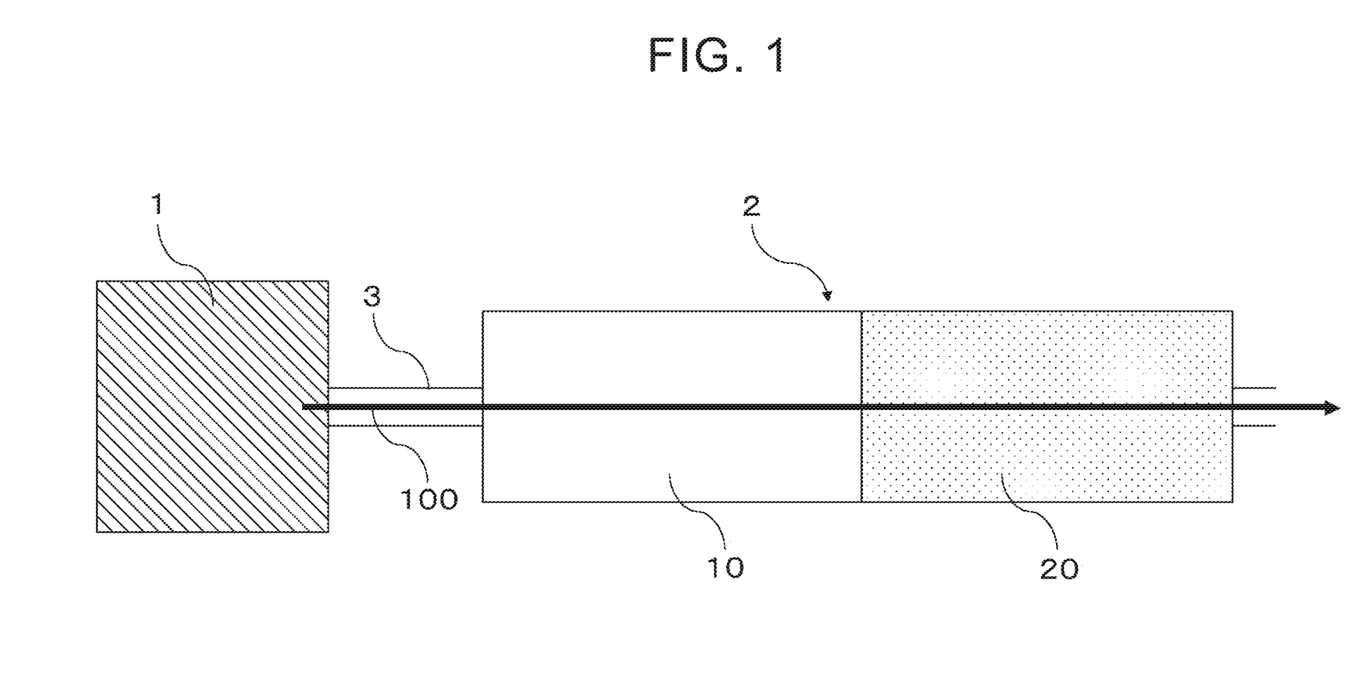
FIG. 1 is a schematic diagram of an exhaust gas control system according to an embodiment of the present disclosure.

As illustrated in FIG. 1, for example, an exhaust gas control system 2 according to a first embodiment of the present disclosure is coupled to an internal combustion engine 1 through a flow path 3 which extends from the internal combustion engine 1 and through which an exhaust gas flows. The exhaust gas control system 2 includes a first exhaust gas control catalyst layer 10 that controls an exhaust gas emitted from the internal combustion engine 1, and a second exhaust gas control catalyst layer 20 that further controls the exhaust gas that has been controlled by the first exhaust gas control catalyst layer 10. More specifically, the exhaust gas control system 2 includes the first exhaust gas control catalyst layer 10 and the second exhaust gas control catalyst layer 20 which are disposed in this order from the internal combustion engine 1 side. The black arrow indicates a flow 100 of the exhaust gas. The exhaust gas flows in the exhaust gas control system 2 in the order of the first exhaust gas control catalyst layer 10 and the second exhaust gas control catalyst layer 20.

In this manner, the second exhaust gas control catalyst layer 20 is an exhaust gas control catalyst layer positioned downstream in the exhaust gas control system 2. Therefore in general the second exhaust gas control catalyst layer 20 tends to be subjected to HC poisoning and coking.

In the exhaust gas control system 2 according to the first embodiment of the present disclosure, the second exhaust gas control catalyst layer 20 contains an oxygen storage material, and the ratio of the amount (mmol—$CO_2/m^2$) of base points per specific surface area ($m^2/g$) of the oxygen storage material to the specific surface area is equal to or less than $4.50\times10^{-5}$.

The amount of base points of the oxygen storage material is the amount of base points calculated as the amount of $CO_2$ desorbed per 1 g of the oxygen storage material through carbon dioxide high-temperature desorption measurement. In the carbon dioxide high-temperature desorption measurement, specifically, a solid sample is caused to adsorb $CO_2$ as probe molecules at a temperature of 100° C. (e.g. by applying a gas with 10% of $CO_2$ and with the remainder being $N_2$ or He to the sample), $CO_2$ in the gas layer is purged with a He gas or a $N_2$ gas, thereafter the temperature of the sample layer is continuously raised (e.g. to 600° C. at 10° C./minute), and the concentration of the generated desorbed gas is measured. The gas concentration is measured using a commercially available catalyst evaluation device (such as "CATA-5000" manufactured by Best Instruments Co., Ltd. or "MEXA-4300FT" manufactured by Horiba, Ltd.). Prior to the measurement, a gas composed of $O_2$ and $N_2$ (or a gas composed of $O_2$ and He etc.) may be supplied to the sample at about 600° C., and then the temperature may be lowered to about 100° C. The strength of the base points can be seen, as $CO_2$ adsorbed by weak base points are desorbed at a low temperature (l (low)-peak) and $CO_2$ adsorbed by strong base points are desorbed at a high temperature (h (high)-peak). The specific surface area of the oxygen storage material can be measured using the Brunauer-Emmett-Teller (B.E.T.) method according to JIS Z-8830.

Such an oxygen storage material has a small amount of base points to which HC in the exhaust gas is to adhere.

Thus, by disposing the oxygen storage material in the second exhaust gas control catalyst layer 20 in which the concentration of oxygen in the exhaust gas is low, HC poisoning and coking in the second exhaust gas control catalyst layer 20 can be suppressed. Further, much oxygen is disposed on the surface of the oxygen storage material, and therefore HC adhering to the base points exposed to the surface are easily oxidized to be converted into $CO_2$. Consequently, HC poisoning and coking can be suppressed with the exhaust gas control system 2 according to the first embodiment of the present disclosure. When metal is exposed with no oxygen disposed on the surface, conversely, the metal adsorbs HC to cause dehydrogenation on the metal, which tends to cause coking.

FIG. 1 is a schematic diagram of the exhaust gas control system according to the first embodiment of the present disclosure. That is, FIG. 1 is merely exemplary, and is not intended to limit the exhaust gas control system according to the present disclosure. Thus, while the first exhaust gas control catalyst layer and the second exhaust gas control catalyst layer are continuous with each other in FIG. 1, for example, such layers may be independent of each other, and may be configured to be coupled to each other by a flow path through which the exhaust gas flows, for example.

First Exhaust Gas Control Catalyst Layer

The first exhaust gas control catalyst layer controls an exhaust gas emitted from the internal combustion engine. The first exhaust gas control catalyst layer includes an exhaust gas control catalyst, e.g. a three-way catalyst.

The three-way catalyst can include catalytic metal particles such as Pt, Pd, or Rh, an oxygen storage material, and a carrier.

The oxygen storage material of the first exhaust gas control catalyst layer may be the same as or different from that of the second exhaust gas control catalyst layer.

When the first exhaust gas control catalyst layer contains an oxygen storage material, the oxygen storage material is preferably different from that of the second exhaust gas control catalyst layer. More specifically, the ratio of the amount (mmol—$CO_2/m^2$) of base points per specific surface area ($m^2/g$) of the oxygen storage material contained in the first exhaust gas control catalyst layer to the specific surface area is preferably more than $4.50\times10^{-5}$.

The ratio of the amount (mmol $CO_2/m^2$) of base points per specific surface area ($m^2/g$) of the oxygen storage material of the first exhaust gas control catalyst layer to the specific surface area may be more than $4.50\times10^{-5}$, equal to or more than $5.00\times10^{-5}$, equal to or more than $5.50\times10^{-5}$, or equal to or more than $6.00\times10^{-5}$, and may be equal to or less than $15.00\times10^{-5}$, equal to or less than $10.00\times10^{-5}$, equal to or less than $7.00\times10^{-5}$, or equal to or less than $5.00\times10^{-5}$.

The first exhaust gas control catalyst layer controls an exhaust gas earlier than the second exhaust gas control catalyst layer. Thus, the concentration of $O_2$ in the exhaust gas that flows through the first exhaust gas control catalyst layer is high. Therefore, HC poisoning and coking are less likely to occur in the first exhaust gas control catalyst layer than in the second exhaust gas control catalyst layer. Thus, HC etc. can be controlled more easily by increasing the amount of base points in the first exhaust gas control catalyst layer.

That is, it is possible to further reduce HC poisoning and coking in the second exhaust gas control catalyst layer, by demonstrating high exhaust gas control performance in the first exhaust gas control catalyst layer and reducing the amount of HC that flows through the second exhaust gas control catalyst layer, by adopting an oxygen storage material, for which the ratio of the amount (mmol—$CO_2/m^2$) of base points per specific surface area ($m^2/g$) to the specific surface area is more than $4.50\times10^{-5}$, in the first exhaust gas control catalyst layer and adopting an oxygen storage material, for which the ratio of the amount (mmol—$CO_2/m^2$) of base points per specific surface area ($m^2/g$) to the specific surface area is equal to or less than $4.50\times10^{-5}$, in the second exhaust gas control catalyst layer.

The first exhaust gas control catalyst layer may be formed on a base material. The base material has an exhaust gas flow upstream end and an exhaust gas flow downstream end. The exhaust gas flow upstream end means an end portion of the base material on the side on which an exhaust gas discharged from the internal combustion engine flows in during use of an exhaust gas control device. Meanwhile, the exhaust gas flow downstream end means an end portion of the base material on the side on which an exhaust gas is discharged.

The base material may be any base material that is used to carry an exhaust gas control catalyst thereon in the exhaust gas control device. Such a base material may be made of ceramics or metal, for example. The base material made of ceramics may be made of cordierite, SiC, etc., for example.

The base material may have a flow path that allows passage of an exhaust gas. The structure of the flow path may be a honeycomb structure, a foam structure, or a plate structure, for example.

When the base material is a honeycomb base material, the catalyst may be disposed in the flow path of the honeycomb base material.

The length of the base material from the exhaust gas flow upstream end to the exhaust gas flow downstream end is not specifically limited, and the base material may be as long as one that is commonly used in an exhaust gas control device.

The first exhaust gas control catalyst layer can be formed by causing slurry, which is prepared by dispersing an exhaust gas control catalyst, a binder, etc. in a dispersion medium, to adhere to the base material by painting etc., optionally drying the slurry, and firing the dried matter, for example.

Second Exhaust Gas Control Catalyst Layer

The second exhaust gas control catalyst layer further controls an exhaust gas that has been controlled by the first exhaust gas control catalyst layer. Thus, the second exhaust gas control catalyst layer may be a portion of the entire exhaust gas control catalyst layer with a length of 50% or less, 40% or less, 30% or less, 20% or less, or 10% or less from the downstream side. The downstream side of the exhaust gas control catalyst layer means the downstream side of the flow of an exhaust gas in the exhaust gas control catalyst layer.

The second exhaust gas control catalyst layer contains an oxygen storage material.

The second exhaust gas control catalyst layer can also include catalytic metal particles such as Pt, Pd, or Rh and a carrier, besides the oxygen storage material. That is, the second exhaust gas control catalyst layer can contain a three-way catalyst, and contain an oxygen storage material as an element of the three-way catalyst.

The second exhaust gas control catalyst layer can also be formed on a base material, as with the first exhaust gas control catalyst layer. The base material on which the second exhaust gas control catalyst layer is formed may be similar to that used for the first exhaust gas control catalyst layer.

The second exhaust gas control catalyst layer may be formed on a base material that is identical to that for the first exhaust gas control catalyst layer, or may be formed on a separate base material. When the second exhaust gas control catalyst layer is formed on a base material that is identical to that for the first exhaust gas control catalyst layer, the second exhaust gas control catalyst layer may be a portion of the entire exhaust gas control catalyst layer on the base material with a length of 50% or less from the downstream side. The first exhaust gas control catalyst layer and the second exhaust gas control catalyst layer may partially overlap each other.

The second exhaust gas control catalyst layer can be formed by a method that is similar to that for the first exhaust gas control catalyst layer using an oxygen storage material, for which the ratio of the amount (mmol—$CO_2/m^2$) of base points per specific surface area ($m^2/g$) of the oxygen storage material to the specific surface area is equal to or less than $4.50 \times 10^{-5}$, for example.

Oxygen Storage Material

The ratio of the amount (mmol—$CO_2/m^2$) of base points per specific surface area ($m^2/g$) of the oxygen storage material of the second exhaust gas control catalyst layer to the specific surface area is equal to or less than $4.50 \times 10^{-5}$.

The ratio of the amount (mmol—$CO_2/m^2$) of base points per specific surface area ($m^2/g$) of the oxygen storage material of the second exhaust gas control catalyst layer to the specific surface area may be equal to or less than $4.50 \times 10^{-5}$, equal to or less than $4.00 \times 10^{-5}$, equal to or less than $3.50 \times 10^{-5}$, or equal to or less than $3.00 \times 10^{-5}$, and may be equal to or more than $0.50 \times 10^{-5}$, equal to or more than $1.00 \times 10^{-5}$, equal to or more than $1.50 \times 10^{-5}$, or equal to or more than $2.00 \times 10^{-5}$.

The specific surface area of the oxygen storage material may be $40.0$ $m^2/g$ to $110.0$ $m^2/g$. The specific surface area of the oxygen storage material may be equal to or more than $40.0$ $m^2/g$, equal to or more than $50.0$ $m^2/g$, equal to or more than $60.0$ $m^2/g$, or equal to or more than $70.0$ $m^2/g$, and may be equal to or less than $110.0$ $m^2/g$, equal to or less than $100.0$ $m^2/g$, equal to or less than $90.0$ $m^2/g$, or equal to or less than $80.0$ $m^2/g$.

The oxygen storage material may be an oxide containing Ce, La, Pr, or a combination thereof. More specifically, the oxygen storage material may be $CeO_2$, $LaO_2$, $PrO_2$, or a combination thereof.

The oxygen storage material can have a fluorite structure. The oxygen storage material having a fluorite structure may have a structure in which the (111) plane is exposed on the surface thereof.

Oxygen atoms are exposed on the (111) plane of the oxygen storage material having a fluorite structure, and metal atoms are positioned in the lower layer, that is, are not exposed. Thus, increasing the exposure of the (111) plane can decrease metal atoms that serve as base points, which can make the ratio of the amount (mmol—$CO_2/m^2$) of base points per specific surface area ($m_2/g$) of the oxygen storage material to the specific surface area equal to or less than $4.50 \times 10^{-5}$.

Such an oxygen storage material can be manufactured through hydrothermal synthesis etc., for example.

When the oxygen storage material is $CeO_2$, for example, the oxygen storage material can be manufactured by dissolving $Ce(NO_3)_3 \cdot 6H_2O$ well in a 10 L aqueous solution containing $Na_3PO_4$, adjusting the PH of the solution to 4, allowing the solution to stand at 170° C. to be subjected to hydrothermal synthesis for 12 hours, thereafter drying the solution at 150° C., and finally firing the dried matter in air at 500° C.

The method of manufacturing the oxygen storage material is not limited to the above.

Exhaust Gas Control Method

The exhaust gas control method according to the present disclosure is a method of controlling an exhaust gas emitted from an internal combustion engine, and includes controlling, by a first exhaust gas control catalyst layer, an exhaust gas emitted from an internal combustion engine, and further controlling, by a second exhaust gas control catalyst layer, the exhaust gas that has been controlled by the first exhaust gas control catalyst layer. The second exhaust gas control catalyst layer contains an oxygen storage material, and the ratio of the amount (mmol—$CO_2/m^2$) of base points per specific surface area ($m^2/g$) of the oxygen storage material to the specific surface area is equal to or less than $4.50 \times 10^{-5}$.

While the exhaust gas control system described above in "Exhaust Gas Control System", for example, can be used for the exhaust gas control method according to the present disclosure, the present disclosure is not limited thereto.

In the exhaust gas control method according to the present disclosure, the first exhaust gas control catalyst layer preferably contains an oxygen storage material, for which the ratio of the amount (mmol—$CO_2/m^2$) of base points per specific surface area ($m^2/g$) to the specific surface area is more than $4.50 \times 10^{-5}$.

As described above in "Exhaust Gas Control System", it is possible to further reduce HC poisoning and coking in the second exhaust gas control catalyst layer, by demonstrating high exhaust gas control performance in the first exhaust gas control catalyst layer and reducing the amount of HC that flows through the second exhaust gas control catalyst layer, by adopting an oxygen storage material, for which the ratio of the amount (mmol—$CO_2/m^2$) of base points per specific surface area ($m^2/g$) to the specific surface area is more than $4.50 \times 10^{-5}$, in the first exhaust gas control catalyst layer and adopting an oxygen storage material, for which the ratio of the amount (mmol—$CO_2/m^2$) of base points per specific surface area ($m^2/g$) to the specific surface area is equal to or less than $4.50 \times 10^{-5}$, in the second exhaust gas control catalyst layer.

EXAMPLES 1-1, 1-2, AND 2-1 TO 2-6 AND COMPARATIVE EXAMPLES 1 TO 5

Example 1-1

100 Parts of $Ce(NO_3)_3 \cdot 6H_2O$ were dissolved well in a 10-L aqueous solution containing 0.37 g of $Na_3PO_4$ for pH buffering. The pH of the solution was confirmed to be 4. The solution was moved to a stirring-type corrosion-resistant reactor, initially stirred only for a certain time, and allowed to stand at 170° C. to be subjected to hydrothermal synthesis for 12 hours. The solid matter obtained after the hydrothermal synthesis was centrifuged or filtered by a conventional method, and washed with distilled water. A decrease in the Na content was observed. The matter was dried at 150° C., and fired in air at 500° C. The obtained $CeO_2$ powder was used as the oxygen storage material according to Example 1-1.

The specific surface area ($m^2/g$) of the oxygen storage material, the amount (mmol—$CO_2/g$) of base points, the amount (mmol—$CO_2/m^2$) of base points per specific surface area, and the ratio of the amount of base points per specific surface area to the specific surface area according to Example 1-1 were as indicated in Table 1 below.

Example 1-2

An oxygen storage material according to Example 1-2 was prepared in the same manner as Example 1-1 except that the hydrothermal synthesis conditions were changed.

The specific surface area ($m^2/g$) of the oxygen storage material, the amount (mmol—$CO_2/g$) of base points, the amount (mmol—$CO_2/m^2$) of base points per specific surface area, and the ratio of the amount of base points per specific surface area to the specific surface area according to Example 1-2 were as indicated in Table 1 below.

Example 2-1

100 Parts of $Ce(NO_3)_3.6H_2O$ were dissolved well in a 10-L aqueous solution containing 0.37 g of $Na_3PO_4$ for pH buffering. The pH of the solution was adjusted to 2 by diluting the solution twice with distilled water and adding nitric acid. For the hydrothermal synthesis conditions, the reaction was carried out at a relatively low temperature of 120° C. for 18 hours. The solid matter obtained after the hydrothermal synthesis was centrifuged or filtered by a conventional method, and washed with distilled water. A decrease in the Na content was observed. The matter was dried at 150° C., and fired in air at 500° C. The obtained nanorod $CeO_2$ powder was used as the oxygen storage material according to Example 2-1.

The specific surface area ($m^2/g$) of the oxygen storage material, the amount (mmol—$CO_2/g$) of base points, the amount (mmol—$CO_2/m^2$) of base points per specific surface area, and the ratio of the amount of base points per specific surface area to the specific surface area according to Example 2-1 were as indicated in Table 1 below.

Examples 2-2 to 2-6

Oxygen storage materials according to Examples 2-2 to 2-6 were prepared in the same manner as Example 2-1 except that the hydrothermal synthesis conditions were changed.

The specific surface area ($m^2/g$) of the oxygen storage materials, the amount (mmol—$CO_2/g$) of base points, the amount (mmol—$CO_2/m^2$) of base points per specific surface area, and the ratio of the amount of base points per specific surface area to the specific surface area according to Examples 2-2 to 2-6 were as indicated in Table 1 below.

Comparative Examples 1 to 5

$CeO_2$ powders manufactured by manufacturing methods according to the related art were used as the oxygen storage materials according to Comparative Examples 1 to 5.

The specific surface area ($m^2/g$) of the oxygen storage materials, the amount (mmol—$CO_2/g$ of base points, the amount (mmol—$CO_2/m^2$) of base points per specific surface area, and the ratio of the amount of base points per specific surface area to the specific surface area according to Comparative Examples 1 to 5 were as indicated in Table 1 below. The specific surface area of the oxygen storage materials were measured using the B.E.T. method according to JIS Z-8830. The amount of base points of the oxygen storage materials was calculated based on the amount of carbon dioxide desorbed per 1 g of the carrier through carbon dioxide high-temperature desorption measurement.

TABLE 1

| Example | Specific surface area ($m^2/g$) | Amount of base points (mmol - $CO_2/g$) | Amount of base points per specific surface area (mmol - $CO_2/m^2$) | Amount of base points per specific surface area/specific surface area |
|---|---|---|---|---|
| Comp. Ex. 1 | 21.1 | 0.0205 | $0.97 \times 10^{-3}$ | $4.60 \times 10^{-5}$ |
| Comp. Ex. 2 | 39.5 | 0.1169 | $2.96 \times 10^{-3}$ | $7.49 \times 10^{-5}$ |
| Comp, Ex. 3 | 61.3 | 0.3255 | $5.31 \times 10^{-3}$ | $8.66 \times 10^{-5}$ |
| Comp. Ex. 4 | 80.5 | 0.6174 | $7.67 \times 10^{-3}$ | $9.53 \times 10^{-5}$ |
| Comp. Ex. 5 | 100.2 | 1.0521 | $10.50 \times 10^{-3}$ | $10.48 \times 10^{-5}$ |
| Ex. 1-1 | 72.2 | 0.0606 | $0.84 \times 10^{-3}$ | $1.16 \times 10^{-5}$ |
| Ex. 1-2 | 100.5 | 0.0918 | $0.91 \times 10^{-3}$ | $0.91 \times 10^{-5}$ |
| Ex. 2-1 | 21.3 | 0.0023 | $0.11 \times 10^{-3}$ | $0.51 \times 10^{-5}$ |
| Ex. 2-2 | 40.6 | 0.0507 | $1.25 \times 10^{-3}$ | $3.08 \times 10^{-5}$ |
| Ex. 2-3 | 51.4 | 0.1020 | $1.98 \times 10^{-3}$ | $3.86 \times 10^{-5}$ |
| Ex. 2-4 | 60.7 | 0.0892 | $1.47 \times 10^{-3}$ | $2.42 \times 10^{-5}$ |
| Ex. 2-5 | 69.8 | 0.1845 | $2.64 \times 10^{-3}$ | $3.79 \times 10^{-5}$ |
| Ex. 2-6 | 83.1 | 0.2792 | $3.36 \times 10^{-3}$ | $4.04 \times 10^{-5}$ |

Figure 2:
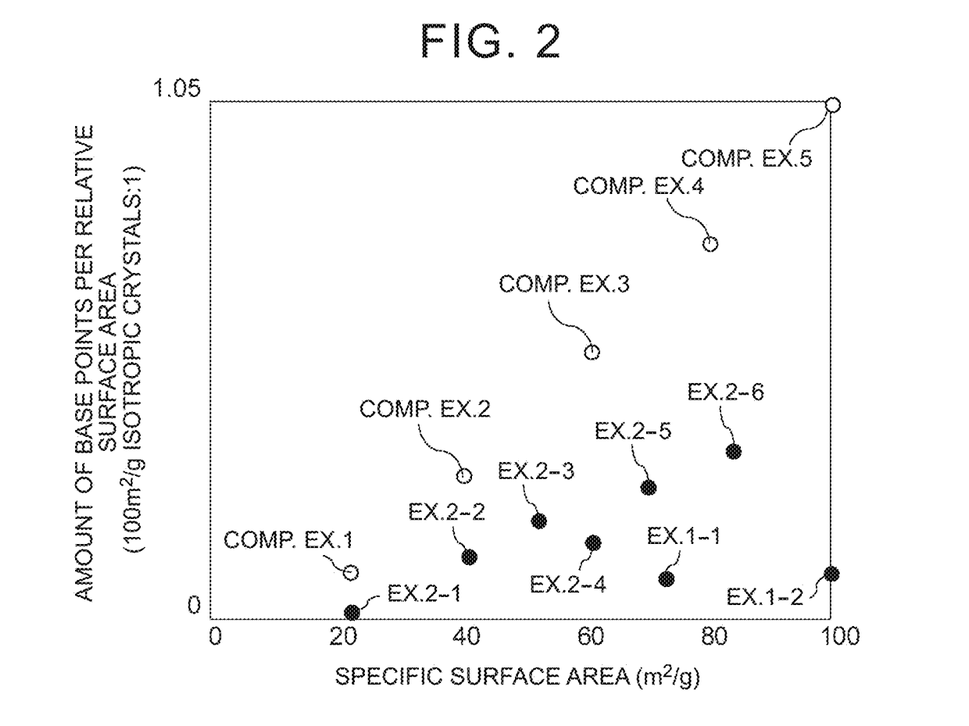
FIG. 2 is a graph illustrating a relationship between the amount of base points and the specific surface area of an oxygen storage material according to each example.

As indicated in Table 1 and FIG. 2, the ratio of the amount of base points per specific surface area to the specific surface area was $0.52 \times 10^{-5}$ to $4.04 \times 10^{-5}$ for the oxygen storage materials according to Examples 1-1, 1-2, and 2-1 to 2-6. On the contrary, the ratio of the amount of base points per specific surface area to the specific surface area was $4.60 \times 10^{-5}$ to $10.48 \times 10^{-5}$ for the oxygen storage materials according to Comparative Examples 1 to 5.

Measurement of Amount of Carbon Deposited

The oxygen storage material according to Example 2-4 and Comparative Example 3 was mixed with Pt as metal catalyst particles and $ZrO_2$ particles as a catalyst carrier to obtain an exhaust gas control catalyst. Slurry in which the exhaust gas control catalyst was dispersed was applied onto a base material and dried to form an exhaust gas control catalyst layer on the base material.

An in-line three-cylinder gasoline engine with a displacement of 0.660 L and with the exhaust gas control catalyst layer attached to an exhaust pipe was driven according to the Worldwide harmonized Light vehicles Test Cycles-high (WLTC-H) mode test procedure using a low-inertia power meter (manufactured by Meidensha Corporation).

The amount of carbon deposited at a position a predetermined distance from the upstream side of the exhaust gas control catalyst layer was measured using a visible absorbance photometer after the lapse of a predetermined time.

Figure 3:
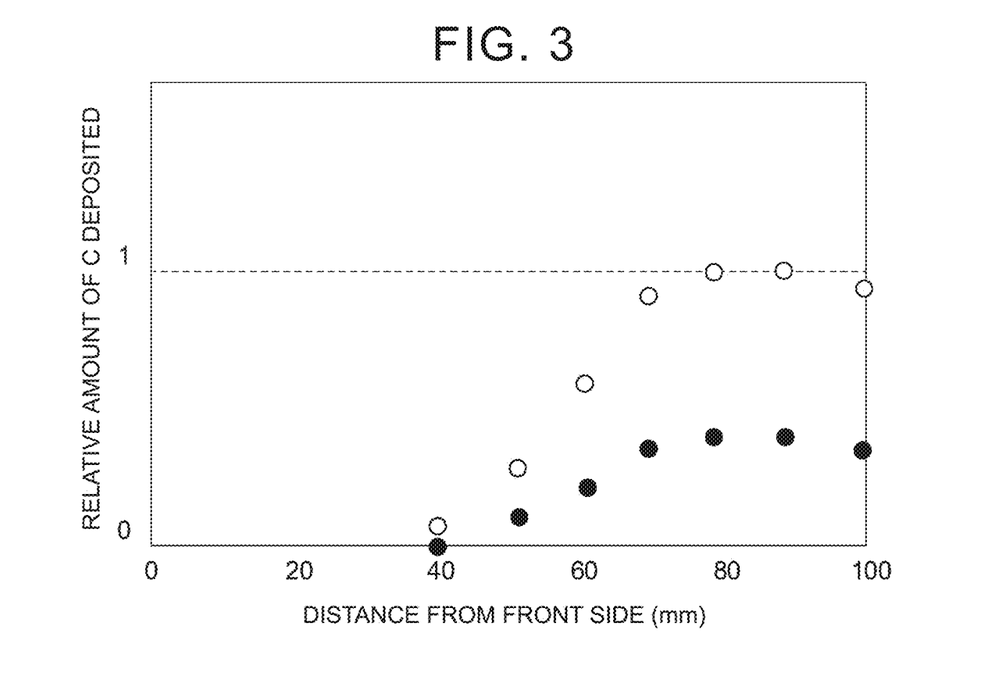
FIG. 3 is a graph in which a comparison is made between the amount of carbon deposited in an exhaust gas control catalyst layer in which an oxygen storage material according to Example 2-4 (black dots) was used and the amount of carbon deposited in an exhaust gas control catalyst layer in which an oxygen storage material according to Comparative Example 3 (white dots) was used.

The measurement results are indicated in FIG. 3.

FIG. 3 is a graph in which a comparison is made between the amount of carbon deposited in the exhaust gas control catalyst layer in which the oxygen storage material according to Example 2-4 was used and the amount of carbon deposited in the exhaust gas control catalyst layer in which the oxygen storage material according to Comparative Example 3 was used. In FIG. 3, the black dots indicate the results with the exhaust gas control catalyst layer in which the oxygen storage material according to Example 2-4 was used, and the white dots indicate the results with the exhaust gas control catalyst layer in which the oxygen storage material according to Comparative Example 3 was used.

As indicated in FIG. 3, deposition of carbon started around a position 40 mm from the upstream side of the exhaust gas control catalyst layer both when the oxygen storage material according to Example 2-4 was used and when the oxygen storage material according to Comparative Example 3 was used.

When a comparison was made, however, a smaller amount of carbon was deposited in the exhaust gas control catalyst layer in which the oxygen storage material according to Example 2-4 was used. This difference became more conspicuous toward the downstream side of the exhaust gas control catalyst layer.

Measurement of Amount of NMHC Discharged

The discharged NMHC was measured using an exhaust gas analysis device (manufactured by Horiba, Ltd.) in a test that was similar to that described above in "Measurement of Amount of Carbon Deposited".

Figure 4:
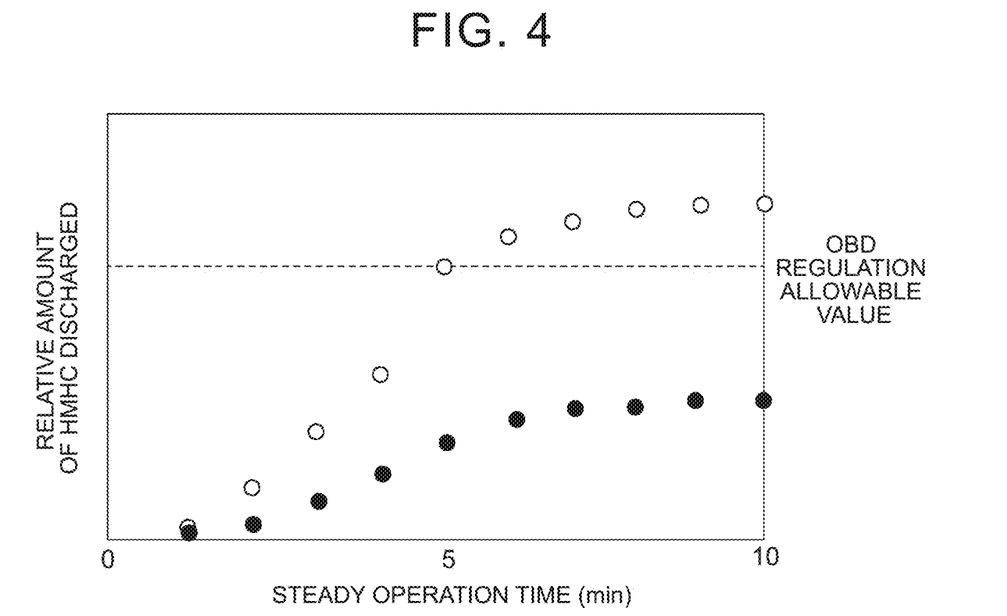
FIG. 4 is a graph in which a comparison is made between the amount of non-methane hydrocarbon (NMHC) discharged in the exhaust gas control catalyst layer in which the oxygen storage material according to Example 2-4 (black dots) was used and the amount of NMHC discharged in the exhaust gas control catalyst layer in which the oxygen storage material according to Comparative Example 3 (white dots) was used.

FIG. 4 is a graph in which a comparison is made between the amount of NMHC discharged in the exhaust gas control catalyst layer in which the oxygen storage material according to Example 2-4 was used and the amount of NMHC discharged in the exhaust gas control catalyst layer in which the oxygen storage material according to Comparative Example 3 was used.

As indicated in FIG. 4, detection of NMHC started after the lapse of about one minute since steady operation had started both when the oxygen storage material according to Example 2-4 was used and when the oxygen storage material according to Comparative Example 3 was used.

When the oxygen storage material according to Example 2-4 was used, the amount of NMHC discharged became flat after the lapse of about five minutes since steady operation had started, and was much smaller than the on-board diagnostic (OBD) regulation allowable value even after the lapse of about ten minutes.

When the oxygen storage material according to Comparative Example 3 was used, on the contrary, the amount of NMHC discharged became more than the OBD regulation allowable value when about five minutes elapsed.

Measurement of Reactivity of Carbon

The oxygen storage materials according to Example 2-4 and Comparative Example 3 after a test that was similar to that described above in "Measurement of Amount of Carbon Deposited" were heated in air, and the reactivity of the carbon deposited at around 90 mm from the upstream side of the exhaust gas control catalyst layer with oxygen in the air was measured using a visible absorbance photometer.

Figure 5:
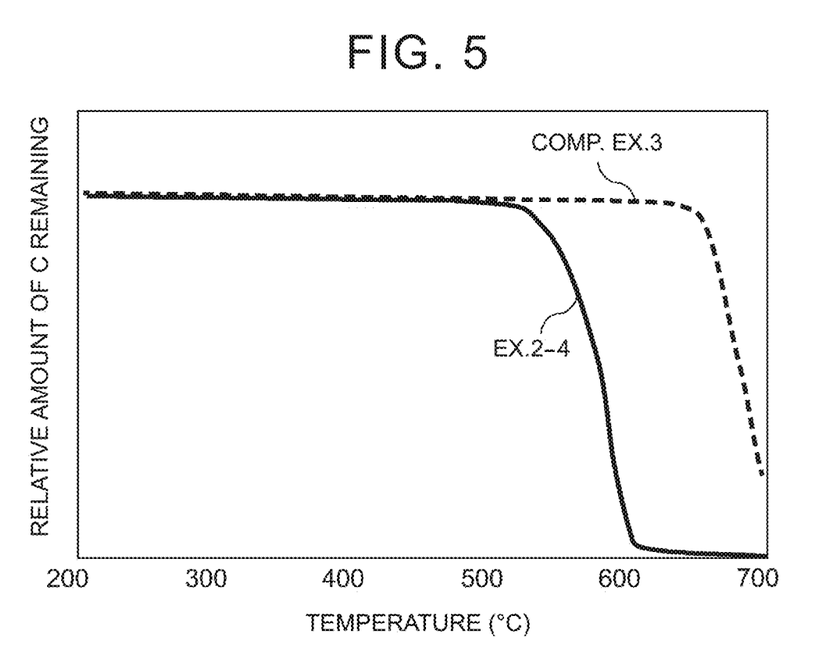
FIG. 5 is a graph in which a comparison is made between the reactivity of carbon deposited in the exhaust gas control catalyst layer in which the oxygen storage material according to Example 2-4 was used and the reactivity of carbon deposited in the exhaust gas control catalyst layer in which the oxygen storage material according to Comparative Example 3 was used.

FIG. 5 is a graph in which a comparison is made between the reactivity of carbon deposited in the exhaust gas control catalyst layer in which the oxygen storage material according to Example 2-4 was used and the reactivity of carbon deposited in the exhaust gas control catalyst layer in which the oxygen storage material according to Comparative Example 3 was used.

As indicated in FIG. 5, when the oxygen storage material according to Example 2-4 was used, the amount of carbon deposited started being reduced at a temperature slightly higher than 500° C.

When the oxygen storage material according to Comparative Example 3 was used, on the contrary, the amount of carbon deposited was not reduced before the temperature reached around 650° C.

What is claimed is:

1. An exhaust gas control system comprising:
    a first exhaust gas control catalyst layer that controls an exhaust gas emitted from an internal combustion engine; and
    a second exhaust gas control catalyst layer configured to further control the exhaust gas that has been controlled by the first exhaust gas control catalyst layer, wherein:
    the second exhaust gas control catalyst layer contains an oxygen storage material; and
    a ratio of an amount (mmol—$CO_2/m^2$) of base points per specific surface area ($m^2/g$) of the oxygen storage material to the specific surface area is equal to or less than $4.50 \times 10^{-5}$.

2. The exhaust gas control system according to claim 1, wherein the specific surface area of the oxygen storage material is 40.0 $m^2/g$ to 110.0 $m^2/g$.

3. The exhaust gas control system according to claim 1, wherein the oxygen storage material is an oxide containing Ce, La, Pr, or a combination of Ce, La, or Pr.

4. The exhaust gas control system according to claim 1, wherein the oxygen storage material is $CeO_2$, $LaO_2$, $PrO_2$, or a combination of $CeO_2$, $LaO_2$, or $PrO_2$.

5. The exhaust gas control system according to claim 1, wherein the oxygen storage material has a fluorite structure.

6. The exhaust gas control system according to claim 1, wherein the second exhaust gas control catalyst layer further contains catalytic metal particles.

7. The exhaust gas control system according to claim 6, wherein the catalytic metal particles are particles of Pt, Pd, or Rh.

8. The exhaust gas control system according to claim 1, wherein the first exhaust gas control catalyst layer contains an oxygen storage material of which a ratio of an amount (mmol—$CO_2/m^2$) of base points per specific surface area ($m^2/g$) to the specific surface area is more than $4.50 \times 10^{-5}$.

9. The exhaust gas control system according to claim 1, wherein the second exhaust gas control catalyst layer is positioned downstream of the first exhaust gas control catalyst layer.

10. An exhaust gas control method of controlling an exhaust gas emitted from an internal combustion engine, the exhaust gas control method comprising:
    controlling, by a first exhaust gas control catalyst layer, the exhaust gas emitted from the internal combustion engine; and
    further controlling, by a second exhaust gas control catalyst layer, the exhaust gas that has been controlled by the first exhaust gas control catalyst layer, wherein:
    the second exhaust gas control catalyst layer contains an oxygen storage material; and
    a ratio of an amount (mmol—$CO_2/m^2$) of base points per specific surface area ($m^2/g$) of the oxygen storage material to the specific surface area is equal to or less than $4.50 \times 10^{-5}$.

11. The method according to claim 10, wherein the first exhaust gas control catalyst layer contains an oxygen storage material of which a ratio of an amount (mmol—$CO_2/m^2$) of base points per specific surface area ($m^2/g$) to the specific surface area is more than $4.50 \times 10^{-5}$.

12. The method according to claim 10, wherein the exhaust gas flows in an exhaust gas control system in an order of the first exhaust gas control catalyst layer and the second exhaust gas control catalyst layer.

* * * * *